US006793279B2

(12) United States Patent
Hoffman et al.

(10) Patent No.: US 6,793,279 B2
(45) Date of Patent: Sep. 21, 2004

(54) RECLINING SEATING UNIT MOVABLE TO HEART-REST POSITION

(75) Inventors: D. Stephen Hoffman, High Point, NC (US); Marcus L. Murphy, Lexington, NC (US)

(73) Assignee: Ultra-Mek, Inc., Denton, NC (US)

( * ) Notice: Subject to any disclaimer, the term of this patent is extended or adjusted under 35 U.S.C. 154(b) by 0 days.

(21) Appl. No.: 10/136,602

(22) Filed: May 1, 2002

(65) Prior Publication Data

US 2003/0015893 A1 Jan. 23, 2003

(51) Int. Cl.[7] .............................. B60N 2/02; A47C 1/02
(52) U.S. Cl. ....................... 297/84; 297/85; 297/354.13
(58) Field of Search ........................ 297/85, 84, 354.13

(56) References Cited

U.S. PATENT DOCUMENTS

| | | | | | |
|---|---|---|---|---|---|
| 3,107,117 | A | * | 10/1963 | Mizelle | 297/89 |
| 3,558,185 | A | * | 1/1971 | Mizelle | 297/84 |
| 4,307,912 | A | * | 12/1981 | Watt et al. | 297/85 |
| 4,953,244 | A | * | 9/1990 | Koerber, Sr. et al. | 5/600 |
| 5,348,367 | A | | 9/1994 | Mizelle | |
| 5,527,095 | A | * | 6/1996 | Marshall et al. | 297/270.1 |
| 5,547,245 | A | * | 8/1996 | Knouse | 297/85 |
| 5,775,775 | A | * | 7/1998 | Hoffman | 297/316 |
| 5,800,010 | A | * | 9/1998 | May | 297/85 |
| D432,804 | S | | 10/2000 | Mizelle et al. | |

* cited by examiner

Primary Examiner—Peter M. Cuomo
Assistant Examiner—Sarah C. Burnham
(74) Attorney, Agent, or Firm—Myers Bigel Sibley & Sajovec

(57) ABSTRACT

A reclining seating unit includes: a generally horizontally disposed seat; a pair of upright arms, each of the arms being positioned adjacent opposite sides of the seat and configured to rest on an underlying surface; a generally upright backrest positioned adjacent to a rear portion of the seat; at least one ottoman; and a pair of reclining mechanisms attached to the seat, arms, backrest and at least one ottoman, and a heart-rest mechanism pivotally interconnected with the reclining mechanisms. The heart-rest mechanism is configured so that the seating unit is movable between fully reclined and heart-rest positions in which the ottoman is disposed forwardly of the seat, the backrest forms a fully reclined angle with the seat that is substantially the same as that formed in the fully reclined position, and the seat forms a heart-rest angle with the underlying surface that is greater than in the fully reclined position.

30 Claims, 5 Drawing Sheets

RECLINING SEATING UNIT MOVABLE TO HEART-REST POSITION

FIELD OF THE INVENTION

The present invention relates generally to health care furniture, and more particularly to health care seating units.

BACKGROUND OF THE INVENTION

The advent of home health care has created a need for furniture that provides functional features for the patient as well as more conventional function for others. For example, chairs exist that are capable of reclining in a number of positions in the same manner as traditional, non-medical recliner chairs while being movable to a "heart-rest" position (also known as the Trendellenburg position). The heart-rest position is one in which the occupant of the chair is postured such that his legs are elevated to a height equal to or above his heart, with the result that blood is encouraged to flow to the heart rather than pooling in the legs. This position is often used to treat shock (particularly during dialysis treatments).

One exemplary chair that combines reclining capability with the capacity to move to the heart-rest position is discussed and illustrated in U.S. Pat. No. 5,348,367 to Mizelle. The Mizelle chair includes a relatively simple six-bar linkage system and can stop in any intermediate position between an upright and a fully reclined position. An attendant can then lift the front of the seat frame of the chair to bring the chair into a "heart-rest" position in which the seat frame, back frame and leg rest assume "the position of a lounge chair that has been tilted approximately 45 degrees." Another exemplary chair, available from Lumex, Inc., utilizes a reclining mechanism from a conventional residential reclining chair. In this chair, the reclining mechanism is configured such that, once the chair is in a fully reclined position (i.e., one in which the backrest and seat have pivoted relative to one another so that the angle therebetween increases), a foot pedal can release the mechanism to continue its reclining motion, with the angle between the backrest and the seat continuing to increase. As a result, the heart-rest position of this chair provides a support surface in which mimics that of a hospital bed.

SUMMARY OF THE INVENTION

A reclining seating unit of the present invention can provide, in a conventional residential reclining chair, improved heart-rest capability. A seating unit of the present invention includes: a generally horizontally disposed seat; a pair of upright arms, each of the arms being positioned adjacent opposite sides of the seat and configured to rest on an underlying surface; a generally upright backrest positioned adjacent to a rear portion of the seat; at least one ottoman; and a pair of reclining mechanisms attached to the seat, arms, backrest and at least one ottoman, and a heart-rest mechanism pivotally interconnected with the reclining mechanisms. Each of the reclining mechanisms comprises a plurality of pivotally interconnected links, the links being configured and arranged such that the seating unit is movable between (a) an upright position, in which the seat is generally horizontally disposed, the backrest is generally upright and adjacent to and rearward of a rear portion of the seat and forms an upright angle with the seat, and the at least one ottoman is positioned below a forward portion of the seat, and (b) a fully reclined position, in which the at least one ottoman is positioned forwardly of the seat and the backrest forms a first fully reclined angle with the seat that is greater than the upright angle, and the seat forms a seat angle with the underlying surface. The heart-rest mechanism is configured so that the seating unit is movable between the fully reclined position and a heart-rest position in which the ottoman is disposed forwardly of the seat, the backrest forms a second fully reclined angle with the seat that is substantially the same as the first fully reclined angle, and the seat forms a heart-rest angle with the underlying surface that is greater than the seat angle. In this configuration, the seating unit can be moved quickly and easily to the heart-rest position in which the legs are well-elevated with little to no disturbance of the posture of the occupant.

DETAILED DESCRIPTION OF THE INVENTION

The present invention now will be described more fully hereinafter with reference to the accompanying drawings, in which preferred embodiments of the invention are shown and described. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout. Some dimensions and thicknesses may be exaggerated for clarity.

The present invention is directed to a reclining chair having a stationary base, a seat, and a backrest. As used herein, the terms "forward", "front" and derivatives thereof refer to the direction defined by a vector extending from the backrest toward the seat parallel to the underlying surface. Conversely, the terms "rearward" and derivatives thereof refer to the direction directly opposite the forward direction; i.e., the rearward direction is defined by a vector that extends from the seat toward the backrest parallel to the underlying surface. The forward and rearward directions together comprise the "longitudinal" directions relative to the chair. The term "outward" and derivatives thereof refer to the direction defined by a vector originating in the center of the seat and extending in the plane of the underlying surface and perpendicular to the forward and rearward directions. The terms "inboard", "inward" and derivatives thereof refer to the direction directly opposite to the lateral direction as defined hereinabove. The outward and inward directions together comprise the "lateral" or "transverse" directions relative to the chair.

Figure 1:
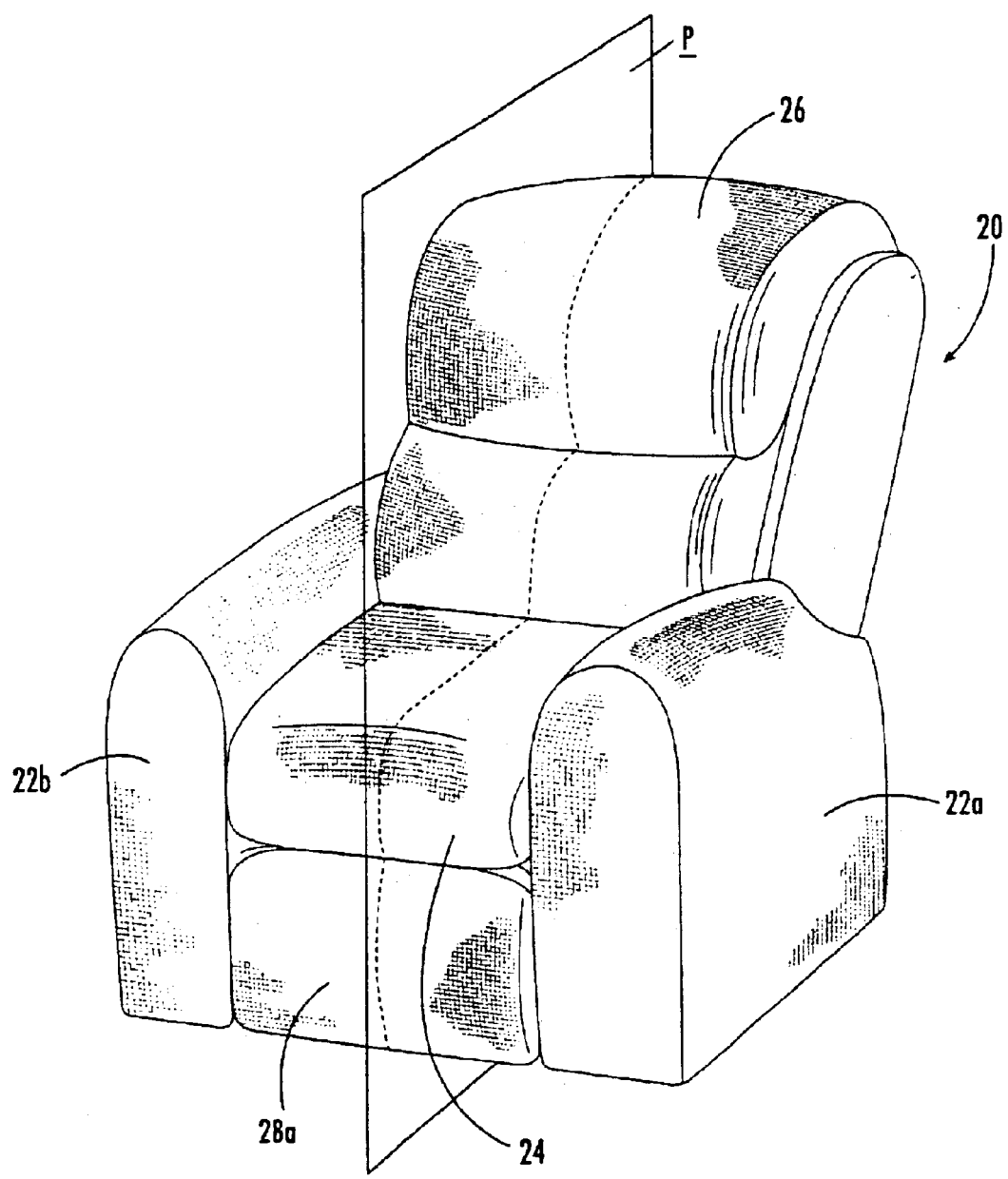
FIG. 1 is a perspective view of a reclining chair of the present invention.

Referring now to the drawings, a chair, designated broadly at 20, is illustrated in FIG. 1. The chair includes a pair of upright arms 22a, 22b that rest on the underlying surface, a horizontally disposed seat 24 disposed between the arms 22a, 22b, and a generally upright backrest 26 that rises upwardly and rearwardly from a rear portion of the seat 24. The chair 20 also includes three ottomans 28a, 28b, 28c that fold below the front portion of the seat 24 when the chair 20 is in an upright position and extend forwardly of the seat 24 when the chair 20 is in a reclined position.

Referring now to FIGS. 2–5, reclining of the chair 20 is controlled by a pair of reclining mechanisms 30, each of which is attached to a respective arm 22a, 22b and to the seat 24. The reclining mechanisms 30 are mirror images of one another about a vertical plane P that is located equidistant between the arms 22a, 22b (see FIG. 1). As such, only one reclining mechanism 30 will be described in detail herein with those skilled in this art understanding that this discussion is equally applicable to the other reclining mechanism 30. Also, the reclining mechanism 30 will be described initially with reference to FIG. 2, which illustrates the chair 20 in an upright position, with subsequent description of the mechanism in the TV, fully reclined, and heart-rest positions to follow. In addition, the reclining mechanisms 30 are illustrated herein as plurality of pivotally interconnected links. Those skilled in this art will appreciate that the pivots between links can take a variety of configurations, such as pivot pins, rivets, bolt and nut combinations, and the like, any of which would be suitable for use with the present invention.

Figure 2:
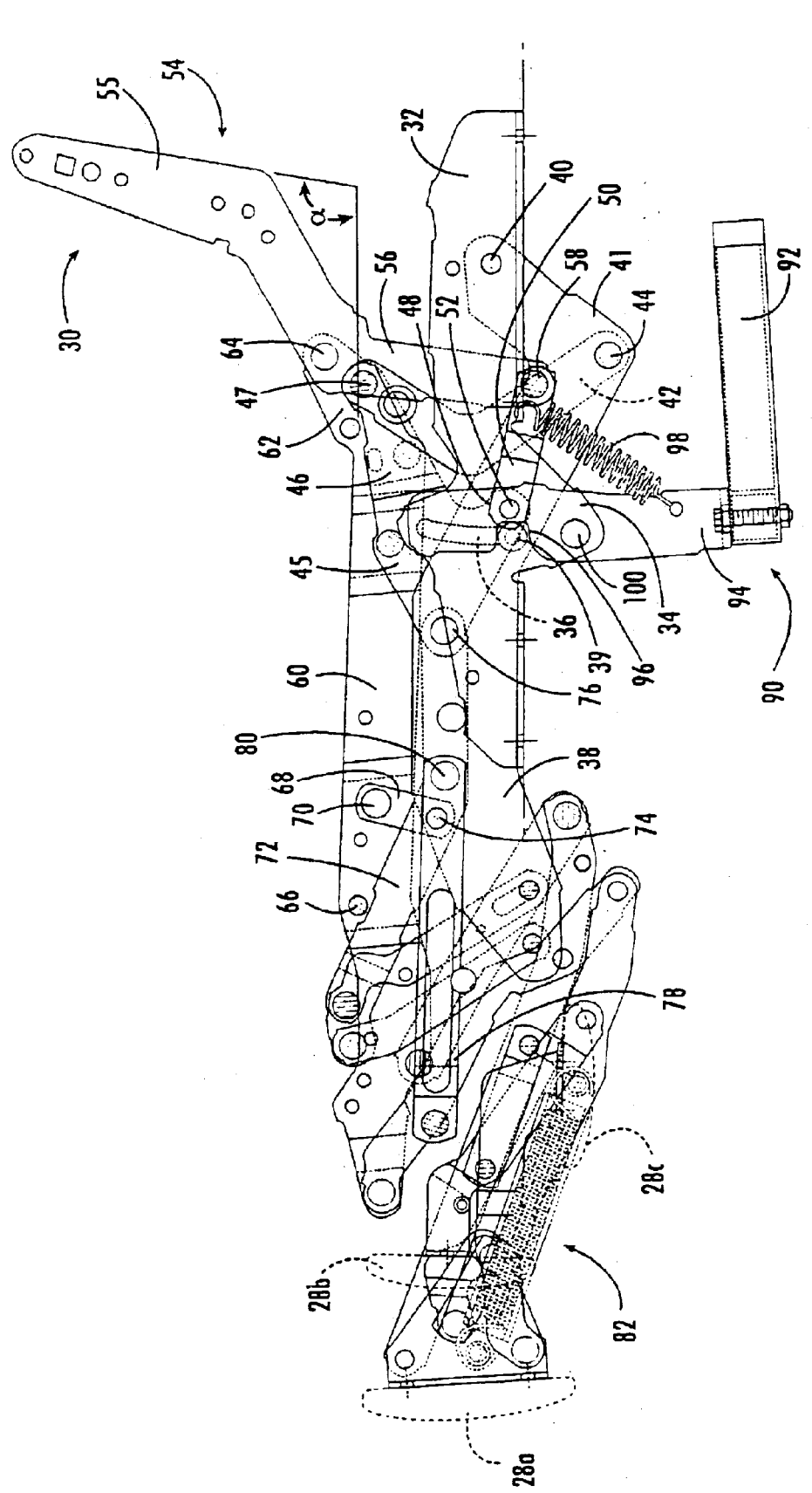
FIG. 2 is a side view of a reclining mechanism of the reclining chair of FIG. 1 showing the chair in its upright position.

Referring to FIG. 2, the reclining mechanism 30 includes an armrest bracket 32 that is generally horizontally disposed and affixed to the rear portion of the arm 22a. The armrest bracket 32 includes a lower projection 34 that extends downwardly from the remainder of the armrest bracket 32. A generally vertically oriented slot 36 is positioned above the lower projection 34; the slot 36 is slightly arcuate and curves slightly rearwardly as it extends upwardly from the lower projection 34.

Referring still to FIG. 2, a carrier link 38 extends generally horizontally. The carrier link 38 is attached to a rear portion of the armrest bracket 32 at a pivot 40. The carrier link 38 includes an angled portion 41 that juts downwardly from the remainder of the carrier link 38 and the pivot 40. A pin 39 extends transversely from the carrier link 38 and extends within the slot 36 of the armrest bracket 32.

Referring again to FIG. 2, a transition link 42 is generally L-shaped and is pivotally attached to the angled portion 41 of the carrier link 38 at a pivot 44. The transition link 42 extends forwardly and upwardly from the pivot 44, then turns upwardly and rearwardly therefrom. A drive link 45 having a rear finger 46 and a downwardly extending tab 48 is attached to the upper end of the transition link 42 at a pivot 47 on the rear finger 46. The tab 48 is attached to the forward end of a short, straight control link 50 at a pivot 52; from the pivot 52, the control link 50 extends generally horizontally and rearwardly.

Still referring to FIG. 2, a tripartite back post 54 is attached at its top portion 55 to the backrest 26 and extends generally downwardly following the contour of the backrest 26. An intermediate segment of the back post 54 then extends downwardly and forwardly to a lower segment 56, which extends generally downwardly. The lower segment 56 terminates at a pivot 58 that interconnects the lower segment of the back post 54 to the rear end of the control link 50.

Referring yet again to FIG. 2, a seat bracket 60 is fixed to the underside of and extends much of the length of the seat 24. A rear section 62 of the seat bracket 60 extends upwardly and rearwardly from the remainder of the seat bracket 60 and terminates at a pivot 64 with the junction of the intermediate and lower segments of the back post 54. The seat bracket 60 also includes a transversely extending stop pin 66 at a forward portion thereof.

Referring once again to FIG. 2, a small, straight control link 68 is pivotally attached at one end to a central portion of the seat bracket 60 at a pivot 70. At its opposite end, the control link 68 is pivotally attached at a pivot 74 to an upper ottoman drive link 72. The upper ottoman drive link 72 is generally horizontally disposed and is pivotally attached at its rear end to the front portion of the drive link 45 at a pivot 76. A straight lower ottoman drive link 78 is attached at its rear end to the carrier link 38 at a pivot 80 and extends forwardly therefrom.

Once again referring to FIG. 2, an ottoman linkage 82 is pivotally attached to the forward end of the upper ottoman drive link 72 and the forward end of the lower ottoman drive link 78 as well as to the forward end of the seat bracket 60. The ottoman link 82 is a pantographic linkage that extends the ottomans 28a, 28b, 28c from their generally vertical disposition when the chair 20 is in an upright position to and extended position, in which the ottomans 28a, 28b, 28c are generally horizontally disposed and positioned forwardly of the seat 24. The ottoman linkage 82 is well known to those skilled in this art and need not be described in detail herein. Also, other pantographic ottoman linkages such as those shown in U.S. Pat. Nos. 4,418,957; 4,570,995 and 4,915,444 to Rogers and U.S. Pat. No. 5,354,116 to May et al. (the disclosures of each of which are hereby incorporated herein by reference in their entireties), may also be suitable for use with the present invention.

Referring yet again to FIG. 2, a heart-rest mechanism 90 is also included in the chair 20 to enable the chair 20 to move to the heart-rest position. The heart-rest mechanism 90 includes a foot pedal 92 that extends laterally of the lower end of the arm 22a. A vertical trigger link 94 is fixed to the upper surface of the foot pedal 92 and extends vertically therefrom. The trigger link 94 includes on its forward surface a notch 96 that captures the pin 39 that is attached to the carrier link 38. In addition, the vertical link 94 is pivotally attached to the lower projection 34 of the armrest bracket 32 at a pivot 100. A spring 98 extends between a lower portion of the trigger link 94 and a reward portion of the armrest bracket 32. The spring 98 is sized so as to be in tension when the trigger link 94 is in the position indicated in FIG. 2.

In operation, the chair 20 can be moved from the upright position of FIG. 2 in which the seat 24 is generally horizontally disposed, the backrest 26 is generally upright and forms an upright angle α (preferably between about 95 and 115 degrees) with the seat 24 adjacent to and rearward of a rear portion of the seat 24, and the ottomans 28a, 28b, 28c are tucked below the seat 24, to the TV position of FIG. 3. This movement is initiated by a seated occupant pressing rearwardly on the backrest 26 (this action is generally supplemented with a forward push on the arms 22a, 22b). The rearward force on the backrest 26 causes the seat 24 and backrest 26 to move rearwardly relative to the arms 22a, 22b. As the backrest 26 moves rearwardly, the backpost 54 in turn moves rearwardly. The rearward movement of the backpost 54 draws the seat bracket 60 rearwardly with little to no relative pivotal movement between the backpost 54 and the seat bracket 60 (i.e, there is little to no change in the angle α). As the seat bracket 60 (and, in turn, the seat 24) move rearwardly, the control link 68, the drive link 45, and the upper ottoman drive link 72 are drawn rearwardly as well. The carrier link 38, which is attached to the armrest bracket 32, remains in its position; consequently, the lower ottoman drive link 78 also retains its position. The rearward movement of the upper ottoman drive link 72 and the absence of rearward movement of the lower ottoman drive link 78 causes the ottoman linkage 82 to extend, such that the ottomans 28a, 28b, 28c are positioned in a generally horizontal disposition in front of the seat 24 (see FIG. 3). The motion ceases when the ottoman linkage 82 is fully extended (cessation of motion is typically due to the interaction between one of the links in the ottoman linkage 82 and a stop pin located on another of the links in the ottoman linkage 82).

Figure 3:
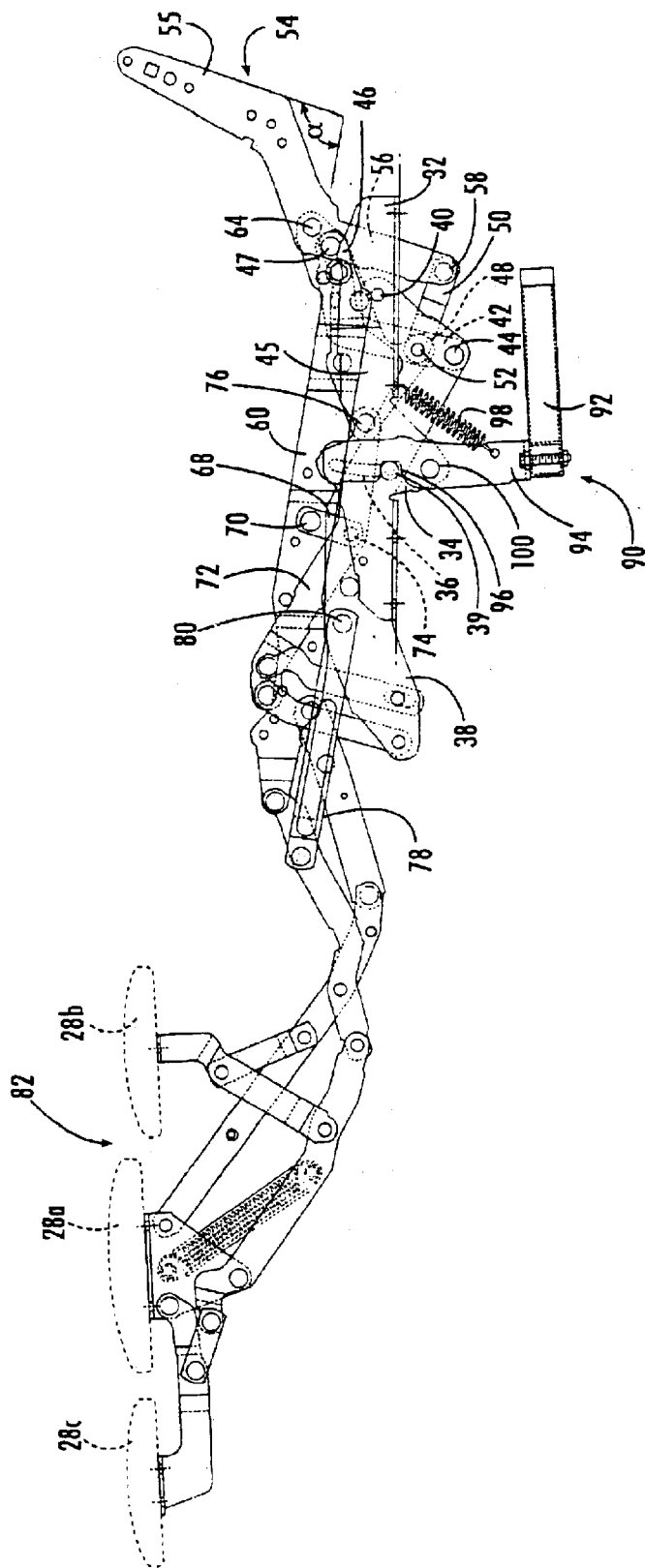
FIG. 3 is a side view of a reclining mechanism of the reclining chair of FIG. 1 showing the chair in its TV position.

To continue the movement of the chair from the TV position of FIG. 3 to the fully reclined position of FIG. 4, the occupant once again pushes his back rearwardly against the backrest 26 (again, often supplemented by a forward press on the arms 22a, 22b). This force causes the backpost 54 (and, in turn, the backrest 26) to rotate about the pivot 64 relative to the seat 24 and seat bracket 60 such that the backrest 26 takes a shallower angle relative to the underlying surface. This action drives the lower end of the backpost 54 forward and upward. The control link 50 moves forwardly and rotates slightly to a more horizontal disposition. The drive link 45 is forced upwardly and rotates slightly about the pivot 52 such that the rear end of the upper ottoman drive link 72 is raised. The elevation of the upper ottoman drive link 72 drives the control link 68 upwardly, which forces the seat bracket 60 upwardly also. Thus, in the fully reclined position, the backrest 26 takes a more reclined position (forming a fully reclined angle β with the seat 24), the seat 24 is raised and forms a seat angle δ with the underlying surface, and the ottomans 28a, 28b, 28c remain extended. Preferably, the fully reclined angle β is between about 120 and 135 degrees, and the seat angle δ is between about 7 and 17 degrees.

Figure 4:
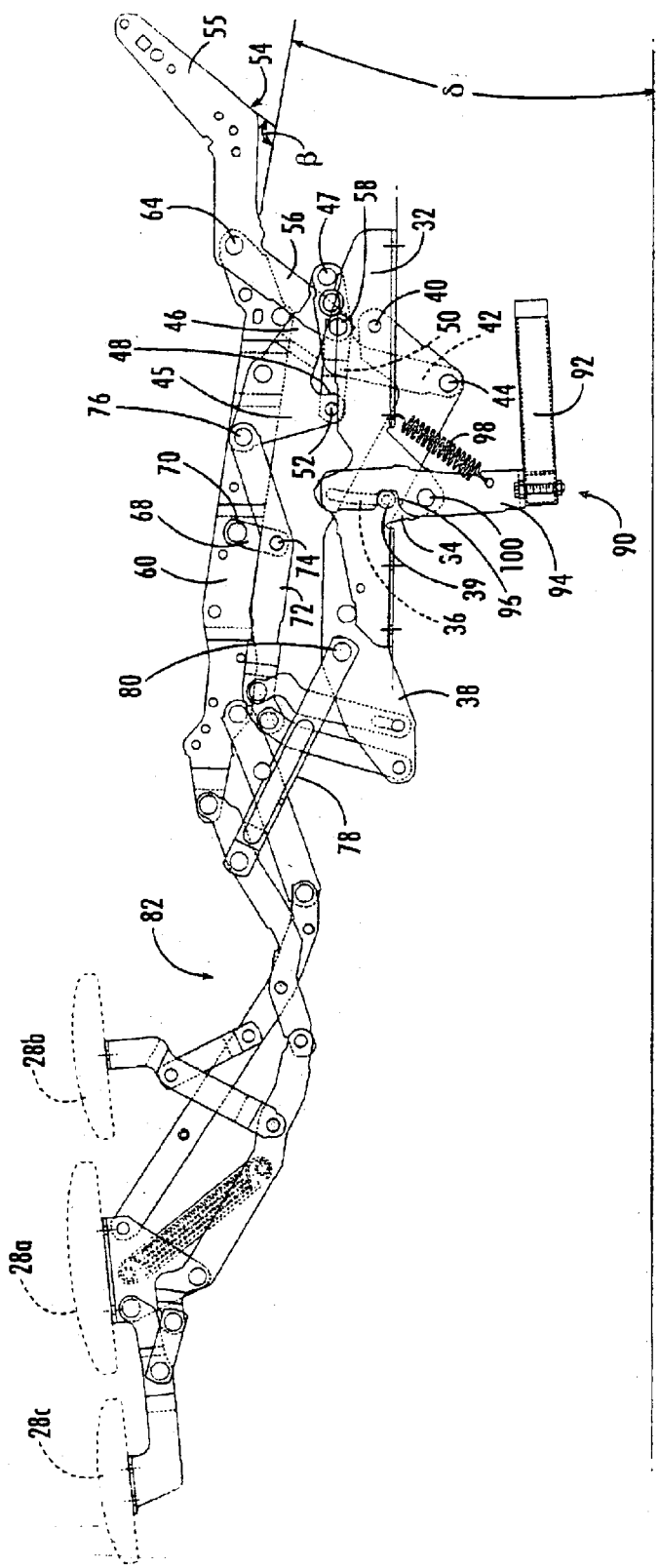
FIG. 4 is a side view of a reclining mechanism of the reclining chair of FIG. 1 showing the chair in its fully reclined position.
Figure 5:
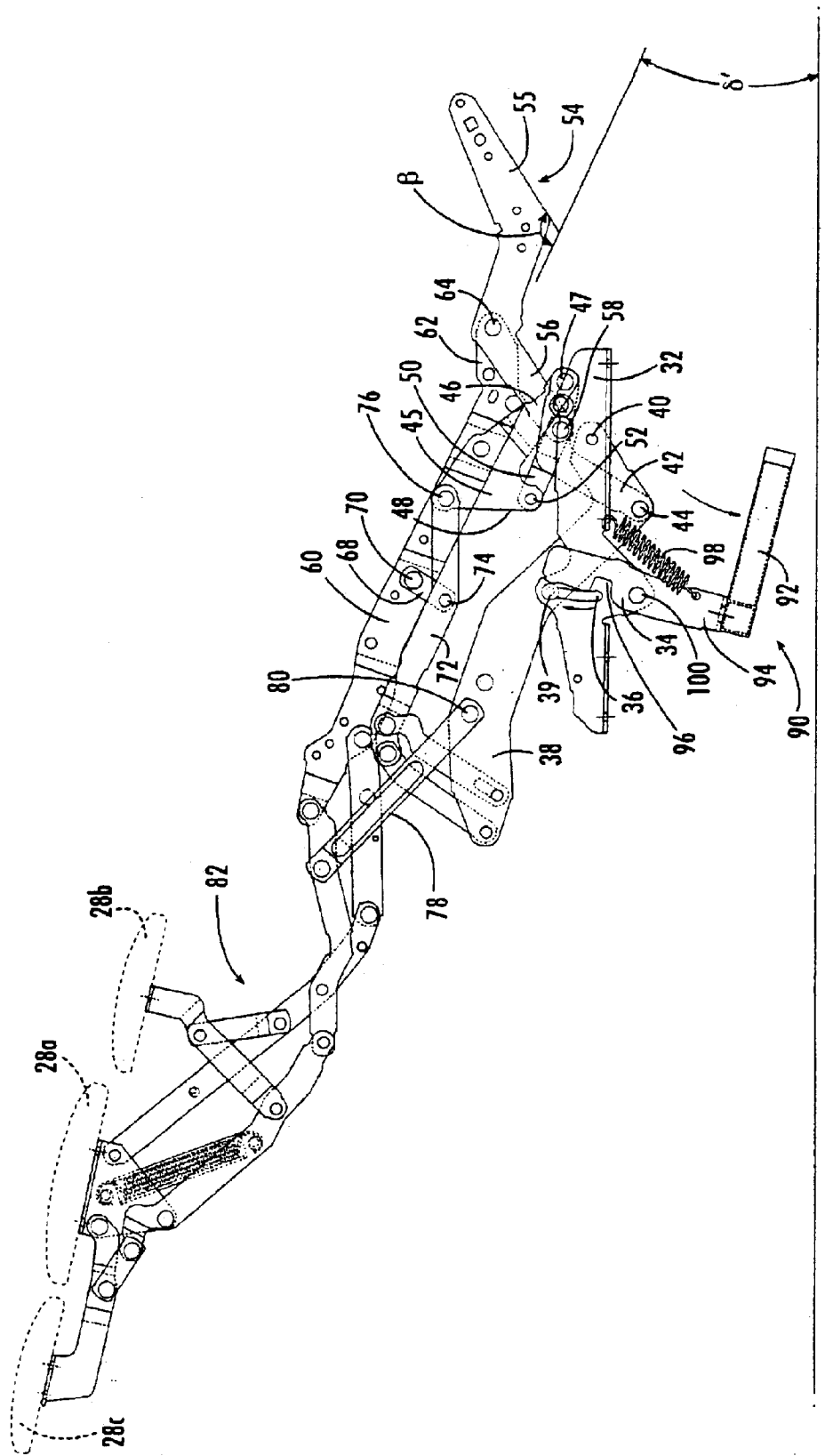
FIG. 5 is a side view of a reclining mechanism of the reclining chair of FIG. 1 showing the chair in its heart-rest position.

From the fully reclined position of FIG. 4, the chair 20 can be moved to the heart-rest position of FIG. 5 by moving the heart-rest mechanism 90 from its unreleased position shown in FIG. 4 to its released position shown in FIG. 5. Movement to the heart-rest position is initiated by forcing the foot pedal 92 forward (the spring 98 biases the trigger link 94 toward the unreleased position, where it remains until the application of force to the foot pedal 92). Doing so causes the trigger link 94 to pivot about the pivot 100, with the result that the upper end of the trigger link 94 moves rearwardly. This action disengages the trigger link notch 96 from the pin 39 located on the carrier link 38. The carrier link 38 is then free to rotate relative to the armrest bracket 32 about the pivot 40 so that the front end of the carrier link 38 rises. This action tips the backrest 26, seat 24 and ottomans 28a, 28b rearwardly to the heart-rest position of FIG. 5, in which the backrest 26, seat 24, and ottomans 28a, 28b have substantially the same relative angular relationship as in the fully reclined position, but have tilted backward relative to the underlying surface (such that the seat forms a heart-rest angle δ' (shown by the angle β) with the underlying surface that is greater than the angle δ formed in the fully reclined position). The motion ceases when the carrier link 38 has rotated sufficiently that the pin 39 reaches the top end of the slot 36. Preferably the heart-rest angle δ' is between about 25 and 35 degrees.

The heart-rest position achieved with the chair 20 and the manner of arriving at this position may be quite desirable. First, the chair 20 is easily moved to the heart-rest position from the fully reclined position with the foot pedal 92. Second, the chair 20 can be moved back to the fully reclined position easily by simply lifting on the top end of the backrest 26. Third, the heart-rest position reached by the chair 20 places the legs of the occupant considerably above the chest of the occupant, which can increase blood flow to the occupant's heart, and does so while the occupant is bent slightly at the waist, which can help to retain the occupant in position in the chair 20.

As noted above, the chair 20 can be returned to the fully reclined position from the heart-rest position by lifting on the top end of the backrest 24 until the pin 39 reaches the bottom of the slot 36, at which point the trigger link 92 re-engages the pin 39 in the notch 94. The chair 20 can be moved back to the TV position by pulling rearwardly on the arms 22a, 22b and pressing downwardly on the seat 24, and back to the upright position by pressing downwardly on the ottomans 28a, 28b.

Those skilled in this art will recognize that other reclining mechanisms may also be suitable for use in seating units of the present invention. In particular, other "press-back" mechanisms (i.e., those that operate via the occupant pressing his back into the backrest) are well-suited for use with the present invention. Exemplary alternative pressback mechanisms are illustrated in U.S. Pat. No. 5,503,453 to Saul et al., the disclosure of which is hereby incorporated herein in its entirety. A chair that reclines directly to a fully reclined position without an intermediate TV position may also be employed.

Moreover, those skilled in this art will appreciate that the heart-rest mechanism may take other forms. For example, the foot pedal may extend forwardly, rather than rearwardly, of the trigger link. Alternatively, the notch on the trigger link may face rearwardly, such that the upper portion of the trigger link moves forwardly, rather than rearwardly, during release of the heart-rest mechanism. The trigger link may pivot relative to the seat bracket above the pin and notch rather than below. As another alternative, the trigger link and pin may be replaced with one or more four-bar linkages that drive the chair from the fully reclined to the heart-rest position. Other alternative configurations may also be recognizable to those skilled in this art.

The foregoing embodiments are illustrative of the present invention and are not to be construed as limiting thereof, the invention being defined by the claims that follow. Although exemplary embodiments of this invention have been described, those skilled in the art will readily appreciate of any modifications are possible in the exemplary embodiments without materially departing from the novel teachings and advantages of this invention.

That which is claimed is:

1. A reclining seating unit, comprising:

a generally horizontally disposed seat;

a pair of upright arms, each of the arms positioned adjacent opposite sides of the seat and configured to rest on an underlying surface;

a generally upright backrest positioned adjacent a rear portion of the seat;

at least one ottoman;

a pair of reclining mechanisms attached to the seat, arms, backrest and at least one ottoman, each of the reclining mechanisms comprising a plurality of pivotally interconnected links, the links being configured and arranged such that the seating unit is movable between (a) an upright position, in which the seat is generally horizontally disposed, the backrest is generally upright and adjacent to and rearward of a rear portion of the seat and forms an upright angle with the seat, and the at least one ottoman is positioned below a forward portion of the seat, and (b) a fully reclined position, in which the at least one ottoman is positioned forwardly of the seat and the backrest forms a first fully reclined angle with the seat that is greater than the upright angle, the seat forms a seat angle with the underlying surface, and the backrest forms a first backrest angle with the underlying surface; and a heart-rest mechanism pivotally interconnected with the reclining mechanism, the heart-rest mechanism being configured so that the seating unit is movable between the fully reclined position and a heart-rest position in which the ottoman is disposed forwardly of the seat, the backrest forms a second fully reclined angle with the seat that is substantially the same as the fully reclined angle, the seat forms a heart-rest angle with the underlying surface that is greater than the seat angle, and the backrest forms a second backrest angle with the underlying surface that is shallower than the first backrest angle.

2. The reclining seating unit defined in claim 1, wherein the heart-rest mechanism is configured to move between an unreleased position and a released position in which the seating unit is movable from the fully reclined position to the heart-rest position.

3. The reclining seating unit defined in claim 2, wherein the heart-rest mechanism includes a foot pedal and a trigger link attached thereto, the trigger link being pivotally interconnected with the reclining mechanism.

4. The reclining seating unit defined in claim 2, wherein each reclining mechanism includes an arm bracket that is fixed to an arm and a carrier link that is pivotally interconnected with the arm bracket at a first pivot, and wherein the trigger link is pivotally interconnected with one of the arm brackets.

5. The reclining seating unit defined in claim 4, wherein the arm bracket includes a generally vertically oriented and arcuate slot, and wherein the carrier link includes a pin that is located within the arm bracket slot, such that, when the seating unit moves between the fully reclined and heart-rest positions, the carrier link pivots about the first pivot relative to the arm bracket and the pin travels within the slot.

6. The reclining seating unit defined in claim 5, wherein the trigger link includes a notch that engages the carrier link pin in the fully reclined position, and wherein pivotal movement of the trigger link relative to the arm bracket disengages the trigger link notch from the carrier link pin, thereby enabling the seating unit to pivot about the first pivot and move to the heart-rest position.

7. The reclining seating unit defined in claim 6, wherein the heart-rest mechanism includes a spring that biases the heart-rest mechanism toward the unreleased position.

8. The reclining seating unit defined in claim 1, wherein the heart-rest angle is between about 23 and 35 degrees, and the first fully reclined angle is between about 120 and 150 degrees.

9. The reclining seating unit defined in claim 8, wherein the seat angle is between about 7 and 17 degrees.

10. A reclining seating unit, comprising:

a generally horizontally disposed seat;

a pair of upright arms, each of the arms positioned adjacent opposite sides of the seat and configured to rest on an underlying surface;

a generally upright backrest positioned adjacent a rear portion of the seat;

at least one ottoman; and a pair of reclining mechanisms attached to the seat, arms, backrest and at least one ottoman, each of the reclining mechanisms comprising a plurality of pivotally interconnected links, the links being configured and arranged such that the seating unit is movable between (a) an upright position, in which the seat is generally horizontally disposed, the backrest is generally upright and adjacent to and rearward of a rear portion of the seat and forms an upright angle with the seat, and the at least one ottoman is positioned below a forward portion of the seat, and (b) a fully reclined position, in which the at least one ottoman is positioned forwardly of the seat and the backrest forms a first fully reclined angle with the seat that is greater than the upright angle, and the seat forms a seat angle with the underlying surface; and a heart-rest mechanism interconnected with the reclining mechanism, the heart-rest mechanism being configured so that the seating unit is movable between the fully reclined position and a heart-rest position in which the ottoman is disposed forwardly of the seat, the backrest forms a second fully reclined angle with the seat that is substantially the same as the first fully reclined angle, and the seat forms a heart-rest angle with the underlying surface that is greater than the seat angle, the heart-rest mechanism comprising:

an arm bracket fixed to the arm of the chair, the arm bracket including a slot;

a carrier link pivotally attached to the arm bracket, the carrier link including a pin that slidably engages the arm bracket slot;

a foot pedal; and a trigger link attached to the foot pedal and pivotally interconnected with the arm bracket, the release link having a notch configured to engage the carrier link pin.

11. The seating unit defined in claim 10, further comprising a spring attached to the trigger link and to the arm bracket.

12. The seating unit defined in claim 10, wherein the reclining mechanism includes an ottoman drive link pivotally interconnected with the carrier link, and further includes an ottoman linkage pivotally interconnected with the ottoman drive link.

13. A reclining seating unit, comprising:

a generally horizontally disposed seat;

a pair of upright arms, each of the arms positioned adjacent opposite sides of the seat and configured to rest on an underlying surface;

a generally upright backrest positioned adjacent a rear portion of the seat;

at least one ottoman;

a pair of reclining mechanisms attached to the seat, arms, backrest and at least one ottoman, each of the reclining mechanisms comprising a plurality of pivotally interconnected links, the links being configured and arranged such that the seating unit is movable between (a) an upright position, in which the seat is generally horizontally disposed, the backrest is generally upright and adjacent to and rearward of a rear portion of the seat and forms an upright angle with the seat, and the at least one ottoman is positioned below a forward portion of the seat, and (b) a fully reclined position, in which the at least one ottoman is positioned forwardly of the seat and the backrest forms a first fully reclined angle with the seat that is greater than the upright angle, and the seat forms a seat angle with the underlying surface; and a heart-rest mechanism pivotally interconnected with the reclining mechanism, the heart-rest mechanism being configured so that the seating unit is movable between the fully reclined position and a heart-rest position in which the ottoman is disposed forwardly of the seat, the backrest forms a second fully reclined angle with the seat that is substantially the same as the fully reclined angle, and the seat forms a heart-rest angle with the underlying surface that is greater than the seat angle;

wherein the at least one ottoman forms a first ottoman angle with the underlying surface in the fully reclined position, and a second ottoman angle with the underlying surface in the heart-rest position that is greater than the first ottoman angle.

14. The reclining seating unit defined in claim 13, wherein the plurality of links of the reclining mechanisms are arranged and configured such that the seating unit is movable to an intermediate TV position between the upright and fully reclined positions in which the at least one ottoman is positioned forwardly of the seat and the backrest and seat form a TV angle that is substantially the same as the upright angle.

15. The reclining seating unit defined in claim 13, wherein the heart-rest mechanism is configured to move between an unreleased position and a released position in which the seating unit is movable from the fully reclined position to the heart-rest position.

16. The reclining seating unit defined in claim 15, wherein the heart-rest mechanism includes a foot pedal and a trigger link attached thereto, the trigger link being pivotally interconnected with the reclining mechanism.

17. The reclining seating unit defined in claim 15, wherein each reclining mechanism includes an arm bracket that is fixed to an arm and a carrier link that is pivotally interconnected with the arm bracket at a first pivot, and wherein the trigger link is pivotally interconnected with one of the arm brackets.

18. The reclining seating unit defined in claim 17, wherein the arm bracket includes a generally vertically oriented and arcuate slot, and wherein the carrier link includes a pin that is located within the arm bracket slot, such that, when the seating unit moves between the fully reclined and heart-rest positions, the carrier link pivots about the first pivot relative to the arm bracket and the pin travels within the slot.

19. The reclining seating unit defined in claim 18, wherein the trigger link includes a notch that engages the carrier link pin in the fully reclined position, and wherein pivotal movement of the trigger link relative to the arm bracket disengages the trigger link notch from the carrier link pin, thereby enabling the seating unit to pivot about the first pivot and move to the heart-rest position.

20. The reclining seating unit defined in claim 19, wherein the heart-rest mechanism includes a spring that biases the heart-rest mechanism toward the unreleased position.

21. The reclining seating unit defined in claim 13, wherein the heart-rest angle is between about 23 and 35 degrees, and the first fully reclined angle is between about 120 and 150 degrees.

22. The reclining seating unit defined in claim 21, wherein the seat angle is between about 7 and 17 degrees.

23. A reclining seating unit, comprising:
a generally horizontally disposed seat;
a pair of upright arms, each of the arms positioned adjacent opposite sides of the seat and configured to rest on an underlying surface;
a generally upright backrest positioned adjacent a rear portion of the seat;
at least one ottoman;
a pair of reclining mechanisms attached to the seat, arms, backrest and at least one ottoman, each of the reclining mechanisms comprising a plurality of pivotally interconnected links, the links being configured and arranged such that the seating unit is movable between (a) an upright position, in which the seat is generally horizontally disposed, the backrest is generally upright and adjacent to and rearward of a rear portion of the seat and forms an upright angle with the seat, and the at least one ottoman is positioned below a forward portion of the seat, and (b) a fully reclined position, in which the at least one ottoman is positioned forwardly of the seat and the backrest forms a first fully reclined angle with the seat that is greater than the upright angle, and the seat forms a seat angle with the underlying surface; and a heart-rest mechanism pivotally interconnected with the reclining mechanism, the heart-rest mechanism being configured so that the seating unit is movable between the fully reclined position and a heart-rest position in which the ottoman is disposed forwardly of the seat, the backrest forms a second fully reclined angle with the seat that is substantially the same as the fully reclined angle, and the seat forms a heart-rest angle with the underlying surface that is greater than the seat angle;

wherein the plurality of links of the reclining mechanisms are arranged and configured such that the seating unit is movable to an intermediate TV position between the upright and fully reclined positions in which the at least one ottoman is positioned generally horizontally and forwardly of the seat and the backrest and seat form a TV angle that is substantially the same as the upright angle.

24. The reclining seating unit defined in claim 23, wherein the heart-rest mechanism is configured to move between an unreleased position and a released position in which the seating unit is movable from the fully reclined position to the heart-rest position.

25. The reclining seating unit defined in claim 24, wherein the heart-rest mechanism includes a foot pedal and a trigger link attached thereto, the trigger link being pivotally interconnected with the reclining mechanism.

26. The reclining seating unit defined in claim 24, wherein each reclining mechanism includes an arm bracket that is fixed to an arm and a carrier link that is pivotally interconnected with the arm bracket at a first pivot, and wherein the trigger link is pivotally interconnected with one of the arm brackets.

27. The reclining seating unit defined in claim 26, wherein the arm bracket includes a generally vertically oriented and arcuate slot, and wherein the carrier link includes a pin that is located within the arm bracket slot, such that, when the seating unit moves between the fully reclined and heart-rest positions, the carrier link pivots about the first pivot relative to the arm bracket and the pin travels within the slot.

28. The reclining seating unit defined in claim 27, wherein the trigger link includes a notch that engages the carrier link pin in the fully reclined position, and wherein pivotal movement of the trigger link relative to the arm bracket disengages the trigger link notch from the carrier link pin, thereby enabling the seating unit to pivot about the first pivot and move to the heart-rest position.

29. The reclining seating unit defined in claim 28, wherein the heart-rest mechanism includes a spring that biases the heart-rest mechanism toward the unreleased position.

30. The reclining seating unit defined in claim 24, wherein the heart-rest angle is between about 23 and 35 degrees, and the first fully reclined angle is between about 120 and 150 degrees.

* * * * *

UNITED STATES PATENT AND TRADEMARK OFFICE
CERTIFICATE OF CORRECTION

PATENT NO. : 6,793,279 B2  
DATED : September 21, 2004  
INVENTOR(S) : Hoffman et al.

Page 1 of 1

It is certified that error appears in the above-identified patent and that said Letters Patent is hereby corrected as shown below:

Title page,
Item [56], References Cited, OTHER DOCUMENTS, should include:
-- Blueprint of Assembly of 0495 Mechanism for Ultra Mek A-0495-0 --

Signed and Sealed this

Eighth Day of February, 2005

JON W. DUDAS
*Director of the United States Patent and Trademark Office*